United States Patent
Brooks

(10) Patent No.: US 11,535,401 B2
(45) Date of Patent: Dec. 27, 2022

(54) AIRPLANE JACK

(71) Applicant: Chris Allen Brooks, Port Orange, FL (US)

(72) Inventor: Chris Allen Brooks, Port Orange, FL (US)

(*) Notice: Subject to any disclaimer, the term of this patent is extended or adjusted under 35 U.S.C. 154(b) by 0 days.

(21) Appl. No.: 17/241,966

(22) Filed: Apr. 27, 2021

(65) Prior Publication Data
US 2022/0340305 A1    Oct. 27, 2022

(51) Int. Cl.
*B64F 5/50*     (2017.01)
*B66F 5/02*     (2006.01)

(52) U.S. Cl.
CPC . *B64F 5/50* (2017.01); *B66F 5/02* (2013.01)

(58) Field of Classification Search
CPC .................................... B64F 5/50; B66F 5/02
See application file for complete search history.

(56) References Cited

U.S. PATENT DOCUMENTS

| | | | | |
|---|---|---|---|---|
| 1,340,147 A * | 5/1920 | Brisben | ................. | B25B 1/2405 |
| | | | | 269/174 |
| 1,377,147 A * | 5/1921 | Dillon | .................... | B66F 15/00 |
| | | | | 254/8 B |
| 1,715,548 A * | 6/1929 | Harkreader | ............ | A43B 23/22 |
| | | | | 36/182 |
| 1,883,157 A * | 10/1932 | Weaver | .................... | H04B 3/28 |
| | | | | 254/6 B |
| 1,885,074 A * | 10/1932 | Burkholder | ............... | B66F 5/02 |
| | | | | 254/6 B |
| 2,062,012 A * | 11/1936 | Opolo | .................... | B60G 11/38 |
| | | | | 267/233 |
| 2020/0298429 A1 * | 9/2020 | Liu | .......................... | B66D 1/60 |

* cited by examiner

*Primary Examiner* — Lawrence Averick

(57) ABSTRACT

An airplane jack to lift a light airplane nose wheel off the ground by the nose wheel fork to allow maintenance. The jack uses a lever to manually pivot on rollers to lift the nose wheel fork by non-marring cradling supports. A sliding lever provides unencumbered wheel access and extra safety against any possible pivoting of the jack by repositioning the lever. The jack's width can be adjusted to work with a plurality of nose wheel forks and varied in size and material to operate with a plurality of airplanes.

14 Claims, 7 Drawing Sheets

AIRPLANE JACK

BACKGROUND OF THE INVENTION

This invention pertains generally to jacks for lifting an airplane for wheel maintenance. It pertains more specifically to a lifting device for raising the nose of a light airplane off the ground surface for removal of the nose wheel.

The nose wheel assembly of light airplane must be periodically lifted off the ground for maintenance purposes. Current procedures documented by prominent small airplane manufacturers are to add weight to the tail of the airplane or to tie down the tail thereby lifting the nose wheel off the ground surface for removal. Some airplane manufacturers further specify the use of jacks and trestles under the tail and wing tip areas as part of their procedure to lift all wheels off the ground surface concurrently.

Current devices exist to lift an airplane by applying an upward pushing or pulling pressure to a propeller. Limitations of the devices may require positioning a jack in front of a nose wheel thereby impeding access to removal of the nose wheel. Another limitation of such devices that apply pressure on a propeller have been stipulated not to be used by some manufacturers as they can damage the propeller.

Rather than utilize any of the existing devices or methods noted in the foregoing, it has become a common practice in airplane maintenance shops to utilize two maintenance technicians to perform the process manually. One person's sole job is to hold down the tail of the airplane while the other person performs the removal and maintenance of the nose wheel. A limitation of this method is an ineffective utilization of one technician's time.

Thus, there currently exists a need for an improved airplane jack to raise a nose wheel assembly.

BRIEF SUMMARY OF THE INVENTION

The present invention is a small airplane jack of lightweight construction that safely and efficiently allows one person to engage the jack using a lever to pivot on rolling mechanisms, pushing a two-sided nose wheel fork upward to lift an airplane nose wheel assembly off the ground, making the nose wheel accessible for removal.

In some embodiments, the invention has an adjustable base, allowing for a variety of nose wheel fork widths. The invention has two vertical supports connected to the base and rolling mechanisms on the rear of the base. Blocks of a non-metallic and low-friction material to be anti-marring to the fork are attached to the vertical supports for supporting the nose wheel fork to lift the nose wheel assembly. A lever allows for sliding while carried by the base.

In some embodiments, the lever is slid forward of the invention and locked by a spring pin connected to the base to secure it for positioning the invention. The fork cradling blocks are positioned against the nose wheel fork as the operator applies a downward physical force to the lever thereby pivoting on the roller assemblies and imparting a lifting force to the nose wheel fork resulting in a stable over-center position whereat the invention is prevented from being moved and the airplane lowered until a lifting force is again applied to the lever. Once the fork is lifted beyond the vertical plane, the lever is efficiently unlocked and slid to the rear of the invention base.

This present invention provides two safety features. The first safety feature wherein the fork cradling blocks are of a unique set of contours that stabilizes the fork to prevent any movement forward, backward or laterally off the fork cradling blocks. The second safety feature wherein the lever prevents any possible pivotal movement of the invention while engaged in the act of supporting the nose wheel and removing the lever as a hazard for clear access to the nose wheel.

The invention can also be scaled up or down in size and material to provide the strength required for use with airplanes of various weights.

Thus this invention provides a new design of airplane jack that imparts convenience, simplicity, stability, and safety advantages to perform nose wheel maintenance on an airplane.

The following detailed description and illustrative drawings will make the foregoing objects, features and advantages of the invention more apparent.

BRIEF DESCRIPTION OF THE DRAWINGS

The present invention is illustrated by way of example, and not by way of limitation, in the figures of the accompanying drawings.

While aspects of the present invention will be described with reference to the details of the embodiments of the invention shown in the drawings (and some embodiments not shown in the drawings), these details are not intended to limit the scope of the invention.

DETAILED DESCRIPTION OF THE EMBODIMENTS

Figure 1:
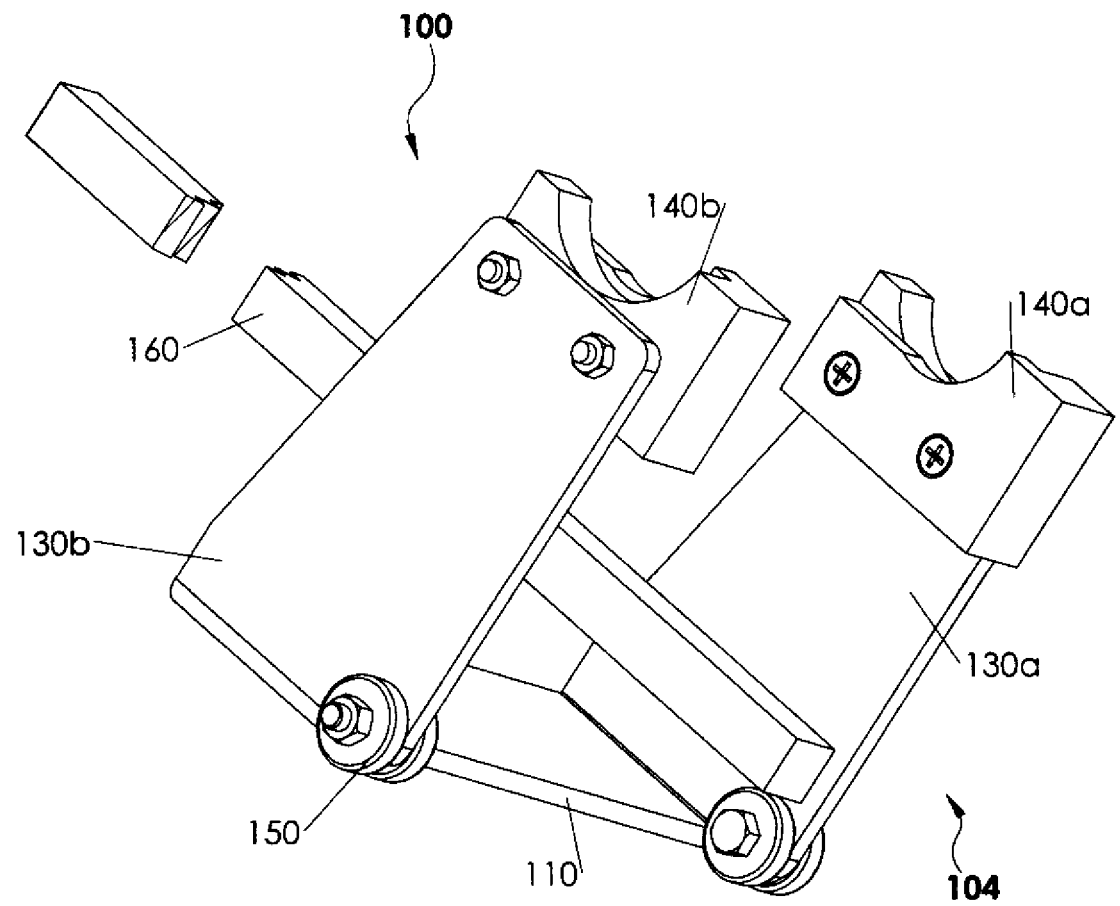
FIG. 1 is a rear perspective view of the invention, according to one of the embodiments, with a portion of the lever broken away.

The following description is not to be taken in a limiting sense, but is made merely for the purpose of describing the general principles of exemplary embodiments; many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

The invention is described with such embodiments, but the invention is not limited to any embodiment. The scope of the invention is limited only by the claims and the invention encompasses numerous alternatives, modifications and equivalents. Several specific details are set forth in the following description to provide a thorough understanding of the invention. These details are provided for the purpose of example and the invention may be practiced according to the claims without some or all of these specific details. In general, the order of the steps of disclosed processes may be altered within the scope of the invention.

Unless otherwise indicated, the drawings are intended to be read (e.g., arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. Also, as used herein, terms such as "positioned on" or "supported on" mean positioned or supported on but not necessarily in direct contact with the surface.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The terms "a" or "an" entity refers to one or more of that entity. As such, the terms "a" (or "an"), "one or more" and "at least one" can be used interchangeably herein.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure. Any alterations and further modifications in the illustrated devices, and such further application of the principles of the invention as illustrated herein are contemplated as would normally occur to one skilled in the art to which the invention relates.

As used herein, the terms "airplane jack apparatus", "jack apparatus" and "airplane jack" are used interchangeably, not in a limiting sense, to refer to the entire airplane jack apparatus structure as the "invention".

As used herein, the term "ground surface" refers to a horizontal surface including, but not limited to, a hangar floor, a tarmac, ground, or any airplane parking area.

For the purposes of promoting an understanding of the principles of the present invention, reference will now be made to the embodiments illustrated in the drawings and specific language will be used to describe the same, only as examples and not intended to be limiting.

An airplane jack apparatus 100 is designed for one person to efficiently raise the nose wheel assembly of an airplane equipped with a two-sided fork (for example, but not limited to, general aviation airplanes sold under the trademarks Cessna, Piper and Diamond).

The airplane jack apparatus 100 is positioned under both sides of a nose wheel fork with the tire in between to then pivot using a lever, forcing the nose wheel assembly to lift.

The airplane jack apparatus 100 may be constructed from hollow tubular steel or aluminum, flat bar steel or aluminum, or a similar material that imparts strength while allowing it to be lightweight. Shown and described below are two embodiments of the invention using square tubing and flat bar.

FIG. 1 shows the components of one possible embodiment of the invention. Said embodiment includes a base 104 comprising a transverse member 110 having two ends, and a left and right vertical fork support 130a and 130b having a top and bottom end. The bottom of each vertical fork support 130a and 130b is connected to opposing ends of the transverse member 110 generally forming an upright U-shaped form.

This embodiment has a rolling mechanism 150 attached at the lower rear of each vertical fork support 130a and 130b. A lever 160 is connected to the inside of one of the vertical fork supports 130a and 130b extending to the front of the airplane jack 100. The lever 160 facilitates the airplane jack 100 pivoting on the rolling mechanisms 150 to push a nose wheel fork 202 upward raising an airplane nose wheel assembly 200 off of a ground surface 300 to perform maintenance on the nose wheel assembly 200.

In this embodiment, a pair of fork cradles 140a and 140b having an indentation on the top surface area for supporting the curved edge of a nose wheel fork 202 are attached at the top of each vertical fork support 130a and 130b allowing the outer sides of the nose wheel fork 202 to be unobstructed. This embodiment has the preferred embodiment for the fork cradles 140a and 140b (further described in FIG. 4 where more detail on their design, and advantages thereof, will be further explained).

Figure 2:
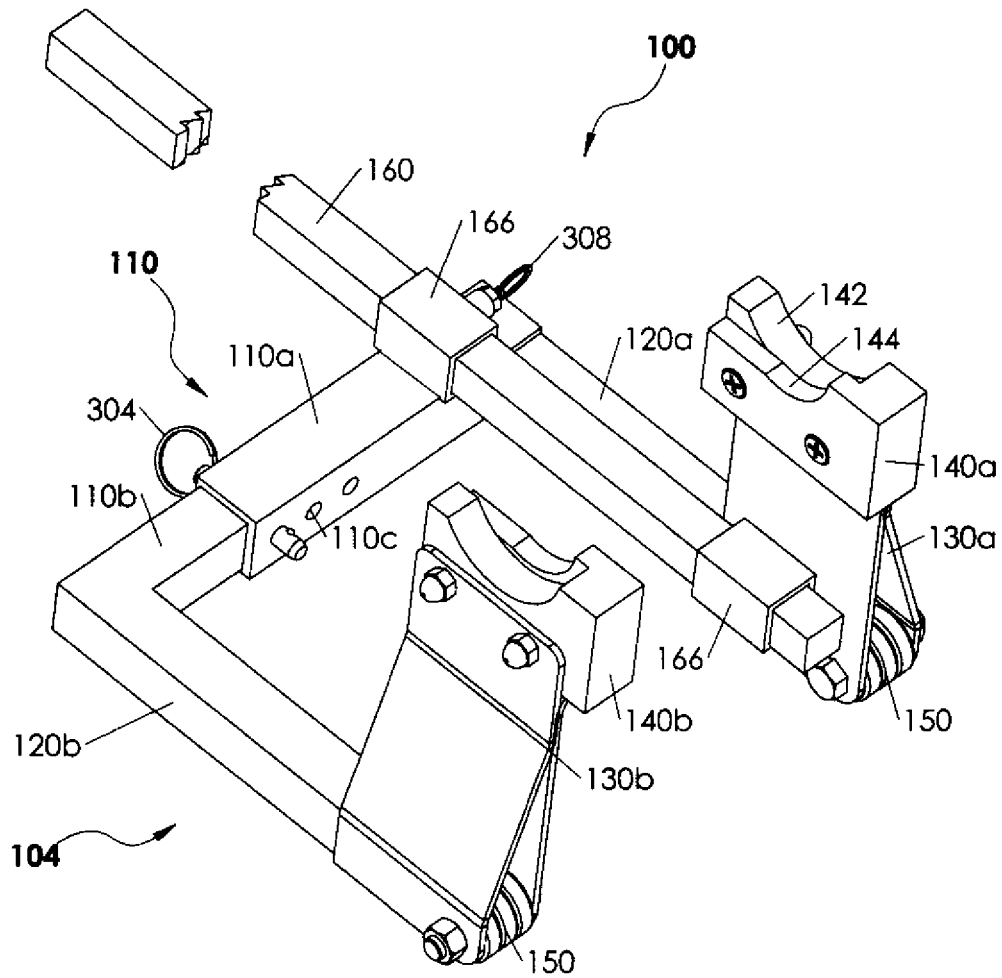
FIG. 2 is a rear perspective view of the invention, according to one of the embodiments, with a portion of the lever broken away.

FIG. 2 shows the preferred embodiment of the invention in its most complete version. In this embodiment, the transverse member 110 is adjustable (described in more detail of FIG. 5) comprising a transverse sleeve 110a and a transverse extension 110b that interconnect and are joined with a locking mechanism 304. Further, a left and right side member 120a and 120b are introduced to allow the transverse member 110 to extend forward of the vertical fork supports 130a and 130b resulting in a deeper base 104 that removes the need to lift the tire 208 higher in order to clear the transverse member 110. Also in this embodiment, the vertical fork supports 130a and 130b comprise a two-sided member connected at the top that separate to form two bottom ends to allow for a more secure connection to the side members 120a and 120b.

In this preferred embodiment, the airplane jack apparatus 100 comprises a base 104 having an adjustable transverse member 110, a left and right side member 120a and 120b having two ends, a left and right vertical fork support 130a and 130b having a top and two bottom ends, and a pair of lever brackets 166. Perpendicularly connected to the outer ends of the joined adjustable transverse member 110 is one end of a side member 120a and 120b that extends horizontally to the rear of the airplane jack 100. The two bottom ends of each left and right vertical fork support 130a and 130b are connected at an equal distance from the adjustable transverse member 110 to the opposing sides of each side member 120a and 120b at their unconnected ends.

In this embodiment, a pair of lever brackets 166 for carrying a lever 160 that can slide are connected horizontally on the base 104. A first lever bracket 166 is connected to the adjustable transverse member 110 and a second lever bracket 166 is connected to the inside of the left vertical fork support 130a. The lever brackets 166 are a larger width than the lever 160 and in precise alignment to facilitate the lever 160 sliding forward and rearward of the airplane jack 100. The lever brackets 166 prevent the lever 160 from any lateral movement away from the base 104. A locking mechanism 308 is used to lock the lever 160 from sliding within the lever brackets 166.

In this preferred embodiment, the locking mechanism 308 is a spring pin which is connected to the outer side of a lever bracket 166. A pin hole 160a (visible only in FIG. 8) is on one side of the lever 160 that the spring pin 308 will make a connection with to lock the lever 160 from sliding.

This embodiment of the airplane jack 100 also has a left and right fork cradle 140a and 140b (the preferred embodiment detailed in FIG. 4) attached to the top of each respective vertical fork support 130a and 130b, a rolling mechanism 150 attached at the bottom rear of each vertical fork supports 130a and 130b, and a lever 160.

In some embodiments, one lever bracket 166 could be used.

The first embodiment of FIG. 1 could use one lever bracket 166 connected to a vertical side support 130a or 130b to allow the airplane jack 100 to use a lever 160 that slides.

Figure 3:
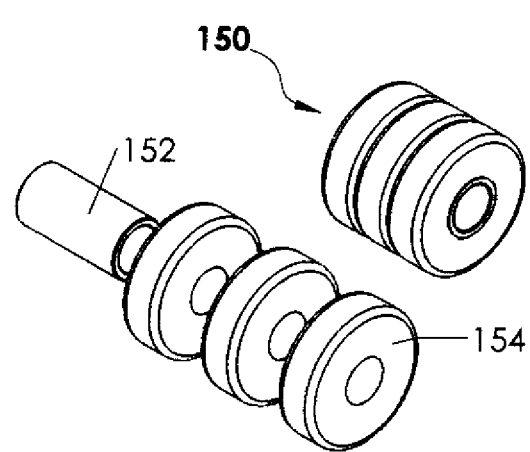
FIG. 3 is a side perspective view of a rolling mechanism, exploded for detail.

FIG. 3 shows one embodiment of a rolling mechanism 150 that is comprised of a set of three identical bearing rollers 154 mounted together on a bushing 152. Said rolling mechanism 150 is shown in FIG. 2.

Another embodiment of a rolling mechanism 150 is shown in FIG. 1 comprised of two identical bearing rollers 154 mounted on the bushing 152 wherein one bearing roller 154 is on each side of a vertical fork support 130a or 130b.

In some embodiments, the fork cradles 140a and 140b comprises a low-friction and non-abrasive material, such as, but not limited to, UHMWPE or Delrin, to protect the nose wheel fork 202 from damage while engaging with the airplane jack 100.

Figure 4:
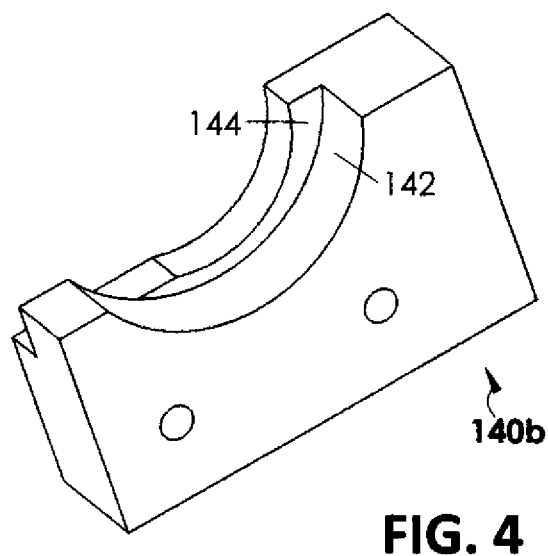
FIG. 4 is a front perspective view of the right fork cradle showing stabilizing safety contours.

FIG. 4 is a preferred embodiment comprising the fork cradles 140a and 140b to be non-marring to the nose wheel fork. Shown is the right fork cradle 140b which has a fork rest 142 to support the nose wheel fork 202. The fork rest 142 has an indentation curved similarly to the nose wheel fork 202 to ensure the nose wheel fork 202 will remain on the fork cradle 140b as the airplane jack 100 pivots.

In this embodiment, a safety feature of this invention is no lateral movement of the nose wheel fork 202 is possible wherein the fork cradle 140b also has a fork wall 144 which has a vertical wall shape that serves as a brace for the inner sides of the nose wheel fork 202 to prevent lateral movement toward the tire 208 off the fork cradle 140b.

Figure 10:
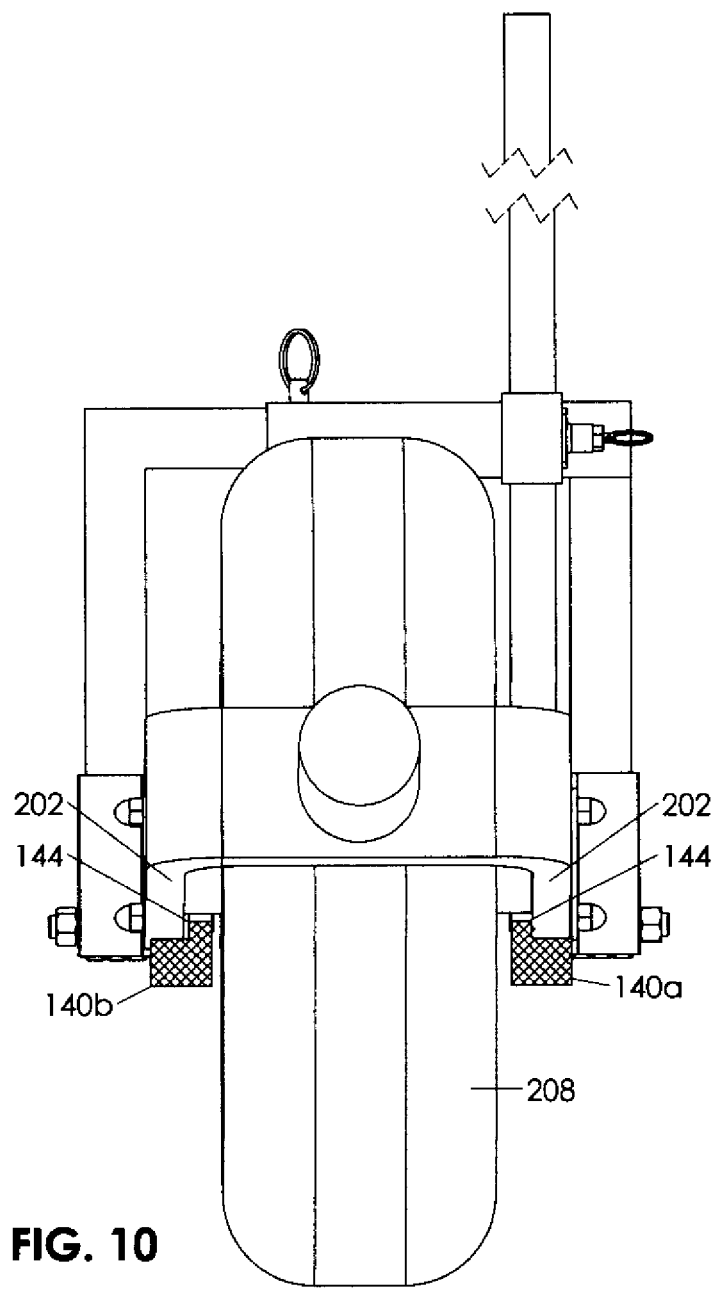
FIG. 10 is a top elevation view of the invention of FIG. 2 showing the nose wheel fork in relation to the fork walls on the fork cradles.

Referring ahead to FIG. 10, the nose wheel fork 202 is shown in relation to the fork cradles 140a and 140b to illustrate the fork walls 144 preventing both of the inner sides of the nose wheel fork 202 being able to move laterally toward the tire 208. Therefore, no lateral movement of the nose wheel fork 202 is possible.

In this preferred embodiment, the fork cradles 140a and 140b have the fork walls 144 existing only on the inner sides of the fork cradles 140a and 140b to allow the fork rests 142 on the outer sides of the fork cradles 140a and 140b to be unobstructed. This is because on some airplanes, the nose wheel mounting hardware being removed from the outer sides of the nose wheel fork 202 is a larger diameter than the nose wheel axle 204 requiring completely free access to the outer sides of the nose wheel fork 202. Therefore, the fork cradles 140a and 140b are attached to the vertical fork supports 130a and 130b in opposite profiles with the fork walls 144 mounted inwardly and the fork rests 142 mounted outwardly on the invention.

In some embodiments, the vertical fork supports 130a and 130b and/or the fork cradles 140a and 140b can be of optional sizes enabling the airplane jack 100 to be adjusted to fit a variety airplanes (e.g., either member set being taller could allow for larger tire diameters).

Figure 5:
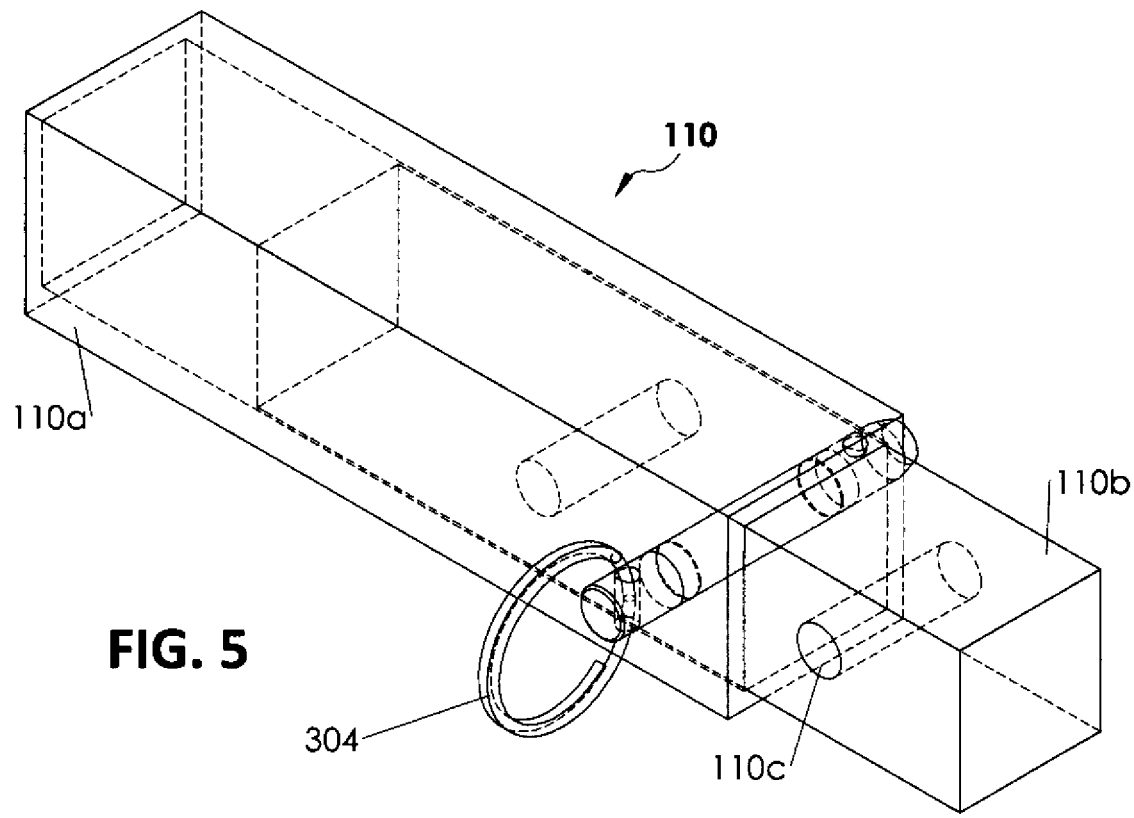
FIG. 5 is a top cross-section view of the adjustable transverse member.

FIG. 5 shows the embodiment for an adjustable transverse member 110 having a transverse extension 110b and a larger transverse sleeve 110a. The transverse extension 110b and transverse sleeve 110a have one or more adjustment holes 110c on the front and rear sides. Shown are three adjustment holes 110c on the transverse extension 110b and one adjustment hole 110c on the transverse sleeve 110a. The transverse extension 110b engages into the transverse sleeve 110a until at least one adjustment hole 110c aligns for a locking pin 304 to enter and exit on opposing sides of the interconnected adjustable transverse member 110. This embodiment feature allows for the width of the base 104 to be variably set, allowing for different nose wheel fork 202 widths on airplanes.

FIGS. 6-10 show the preferred embodiment of the airplane jack 100 for illustrating several stages of using the airplane jack 100 to securely lift a nose wheel assembly 200 for maintenance.

Figure 6:
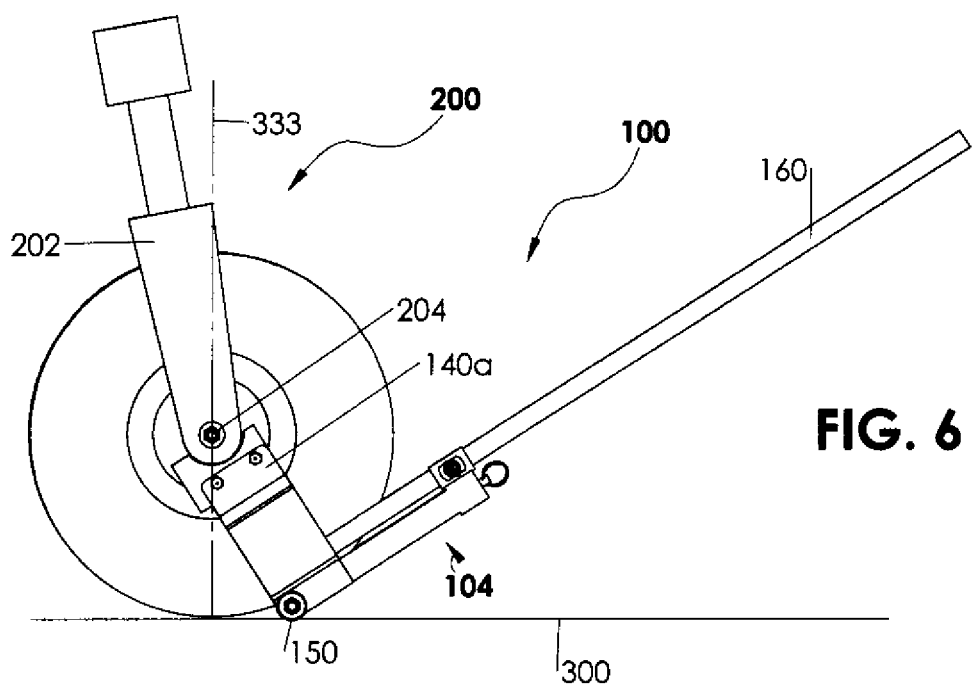
FIGS. 6 and 7 are side elevation views of the invention of FIG. 2 depicting the operative lift and support orientations of the jack apparatus in relation to the nose wheel fork and the ground surface.

FIG. 6 shows the initial positioning of the airplane jack 100 with the fork cradles 140a (shown) and 140b (not visible) against the nose wheel fork 202 with the rolling mechanism 150 ahead of the vertical plane 333.

As the lever 160 is moved downward, the rolling mechanisms 150 are forced toward the vertical plane 333 causing the fork cradles 140a and 140b to rise, lifting the nose wheel fork 202. A nose wheel fork 202 is at maximum height when the rolling mechanisms 150 are aligned with the vertical plane 333 and then lowers as the rolling mechanisms 150 continue to roll, passing through the vertical plane 333. A nose wheel fork 202 is then in a stable over-center supported position where the weight of the airplane is distributed across the base 104.

Figure 7:
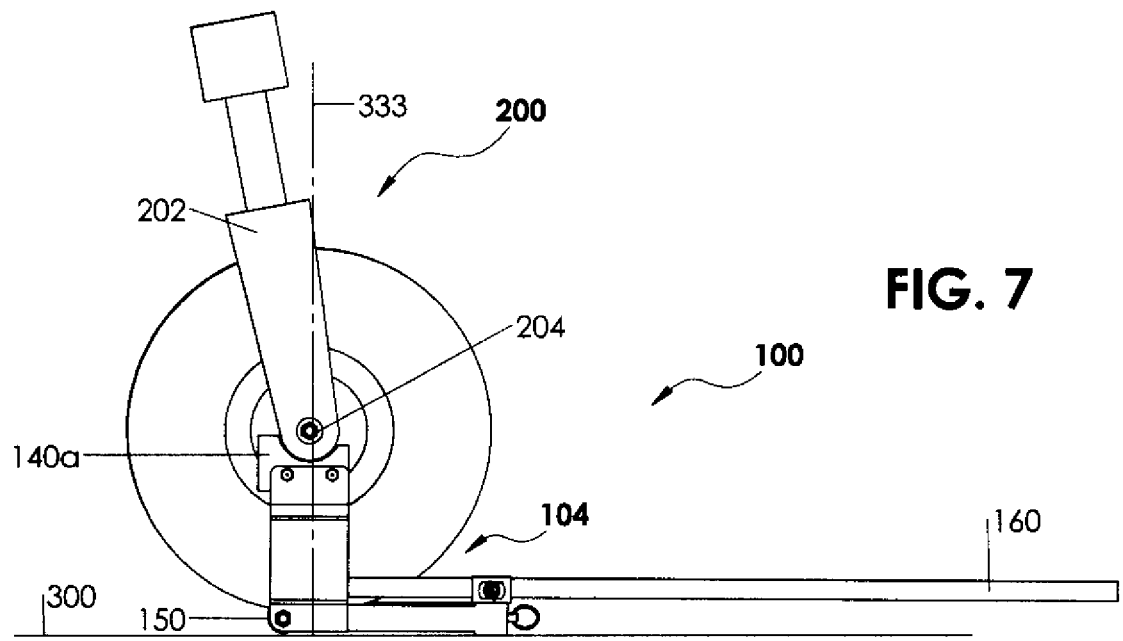

FIG. 7 shows the nose wheel assembly 200 in the raised orientation where the base 104 is horizontal to the ground surface 300 and the rolling mechanism 150 is past the vertical plane 333.

Figure 8:
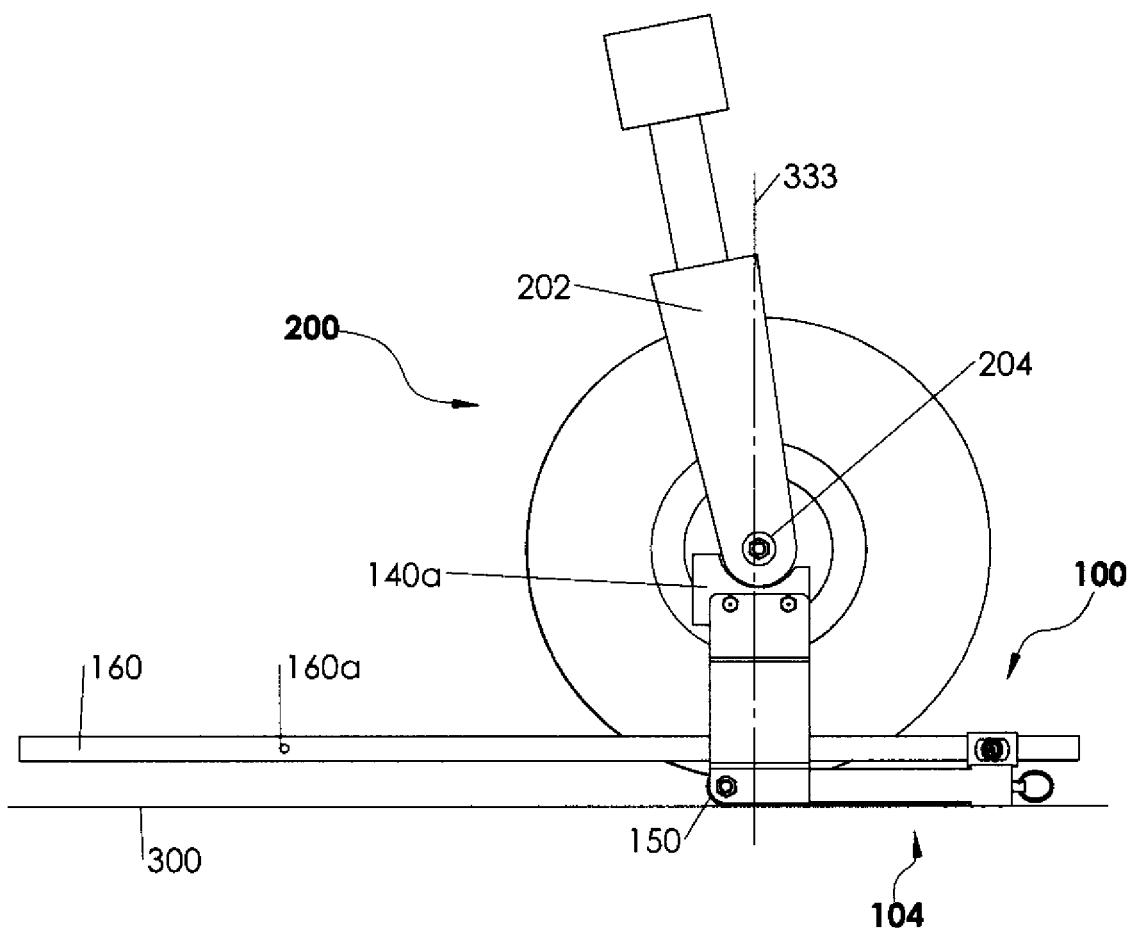
FIG. 8 is a side elevation view of the invention of FIG. 2 shown with the nose wheel raised, depicting the lever security slide position in relation to the jack apparatus and ground surface.

FIG. 8 shows the lever 160 slid to the rear of the airplane jack 100 while the airplane jack 100 has the nose wheel assembly 200 raised off the ground surface 300 during maintenance of the nose wheel assembly 200.

Figure 9:
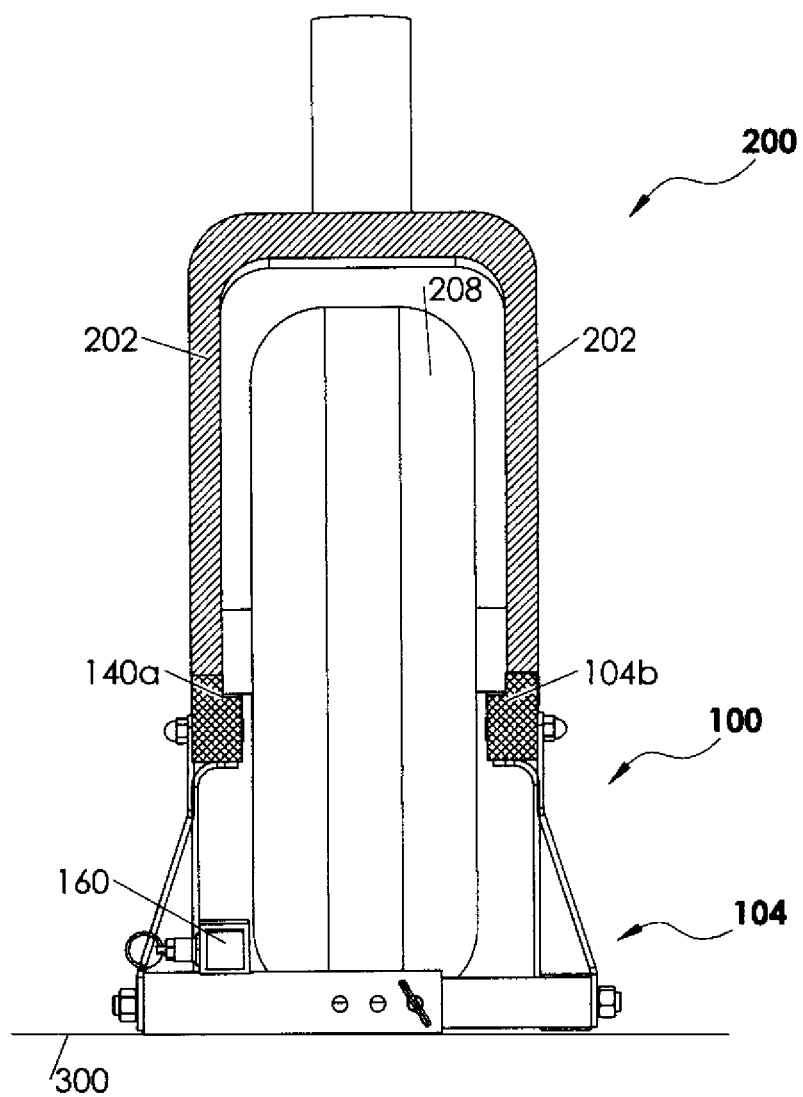
FIG. 9 is a front elevation view of the invention of FIG. 2 shown in relation to the nose wheel assembly raised upon the jack apparatus.

FIG. 9 shows the nose wheel assembly 200 raised on the airplane jack 100 as it is viewed when maintaining the nose wheel assembly 200.

The safety features of the lever 160 able to slide to the rear of the airplane jack 100 as has been shown and described, and benefits of preferred embodiment features, will be apparent with the processes described below for using the airplane jack 100 as depicted in FIGS. 6-9.

In the preferred embodiment, the airplane jack 100 has a sliding lever 160 and usage of the airplane jack 100 begins with the lever 160 positioned to the front of the airplane jack 100 with the spring pin 308 engaged in the pin hole 160a on the lever 160 to prevent sliding.

In the preferred embodiment, the airplane jack 100 with the sliding lever 160 provides an efficient one person operation for lifting a nose wheel assembly 200 from the ground surface 300. The user rolls the airplane jack 100 by one hand to position the airplane jack 100 with the fork rests 142 under the nose wheel fork 202. The user presses down on the lever 160 to engage the fork cradles 140a and 140b upward against the nose wheel fork 202, pivoting the airplane jack 100 and raising the nose wheel assembly 200, until the base 104 comes into contact with the ground surface 300. The airplane jack 100 is thereby in a stable over-center position. The user then pulls on the spring pin 308 and slides the lever 160 to the rear of the airplane jack 100.

As has been described, the sliding lever 160 is eliminated as an obstruction to the ground surface 300 in front of the nose wheel assembly 200. The sliding lever 160 serves as an additional safety feature by preventing the airplane jack 100 from pivoting out of the raised position while maintenance is being performed.

In the preferred embodiment, the airplane jack 100 with the sliding lever 160 also provides an efficient one person operation for lowering the airplane nose wheel assembly 200 back to the ground surface 300. The user pulls on the sliding lever 160 with one hand toward the front of the airplane until the pin hole 160a on the side of the lever 160 makes contact with the spring pin 308 resulting in an automatic locking of the lever 160 from further sliding motion. The user pulls upward on the lever 160 to pivot the jack apparatus 100 on the rolling mechanisms 150 until the tire 208 makes contact with the ground surface 300. The user pulls the lever 160 to roll the airplane jack 100 out of the airplane perimeter. The airplane jack 100 is efficiently readied for use on another airplane.

The embodiments of the present invention may be utilized individually, concurrently, or in any sequential combination.

Those skilled in the art to which this application relates will appreciate that other and further additions, deletions, substitutions, and modifications may be made to the described embodiments.

What is claimed is:

1. An airplane jack comprising:
a base having a left and right vertical fork support connected by a transverse member;
wherein,
the left and right vertical supports are two distinct supports, and
a fork cradle,
wherein the fork cradle comprises a non-metallic, low-friction, anti-marring and non-abrasive material,
and positioned at the top of each vertical fork support,
and the fork cradle directly engages a nose wheel fork whereat the nose wheel fork is adjacent to a nose wheel axle,
at least one roller attached to the bottom rear of the base; and
a sliding lever extending from the base, and
a locking spring pin to lock the sliding lever in place.

2. The airplane jack of claim 1,
wherein the lever is connected horizontally oriented to the base.

3. The airplane jack of claim 1,
further comprising:
at least one lever bracket having a larger diameter or width than the lever,
connected to the base horizontally oriented wherein the lever can slide to the front and rear of the airplane jack within said at least one lever bracket.

4. The airplane jack of claim 1,
wherein the fork cradles have a fork rest with an indentation for the nose wheel fork to be securely positioned as the airplane jack pivots.

5. The airplane jack of claim 1,
wherein the fork cradles have a fork wall rising vertically as a brace to prevent the nose wheel fork from lateral movement toward the tire.

6. The airplane jack of claim 1,
wherein the at least one roller is comprised of at least one bearing roller mounted on a bushing.

7. A method for using the airplane jack in claim 1,
providing safe access while maintaining a nose wheel assembly comprising:
positioning the airplane jack having the base with the transverse member and the pair of vertical fork supports,
the lever is locked in position to the front of the airplane jack by the locking spring pin to lift a nose wheel assembly,
wherein the fork cradles are against the nose wheel fork,
the lever is pressed downward until the base makes contact with a ground surface wherein the nose wheel assembly has been lifted off the ground surface into a stable over-center position;
unlocking the lever;
sliding the lever toward a tail of the airplane therein preventing the airplane jack from pivoting; and
maintaining the nose wheel assembly while the lever is not an obstruction.

8. An airplane jack comprising:
a base having a horizontal left and right side member perpendicularly connected to opposing ends of a transverse member,
a left and right vertical fork support connected to the rear of the respective left and right side member at equal distance from the transverse member;
wherein,
the left and right vertical supports are two distinct supports,
a fork cradle,
wherein the fork cradle comprises a non-metallic, low-friction, anti-marring and non-abrasive material,
and positioned at the top of each vertical fork support,
and the fork cradle directly engages a nose wheel fork whereat the nose wheel fork is adjacent to a nose wheel axle,
at least one roller attached to the bottom rear of the base; and
a sliding lever extending from the base,
and a locking spring pin to lock the sliding lever in place.

9. The airplane jack of claim 8,
wherein the lever is connected horizontally oriented to the base.

10. The airplane jack of claim 8,
further comprising:
at least one lever bracket having a larger diameter or width than the lever,
connected to the base horizontally oriented wherein the lever can slide to the front and rear of the airplane jack within said at least one lever bracket.

11. The airplane jack of claim 8,
wherein the fork cradles have a fork rest with an indentation for the nose wheel fork to be securely positioned as the airplane jack pivots.

12. The airplane jack of claim 8,
wherein the fork cradles have a fork wall rising vertically as a brace to prevent the nose wheel fork from lateral movement off the fork cradles.

13. The airplane jack of claim 8,
wherein the at least one roller is comprised of at least one bearing roller mounted on a bushing.

14. The airplane jack of claim 8,
wherein the transverse member has a transverse extension having a plurality of holes,
a transverse sleeve having a plurality of holes and a larger diameter or width than the transverse extension, and
a locking pin wherein the locking pin locks the interconnection of the transverse extension within the transverse sleeve to variably establish the base width.

* * * * *